United States Patent [19]

Zorn et al.

[11] Patent Number: 4,982,670
[45] Date of Patent: Jan. 8, 1991

[54] COVERED HANGER CONVEYANCE RAIL SYSTEM

[76] Inventors: David R. Zorn, 142 S. Lodge La., Lombard, Ill. 60148; David K. Zorn, 3 N. 210 Cuyahoga, West Chicago, Ill. 60185

[21] Appl. No.: 319,404

[22] Filed: Mar. 3, 1989

[51] Int. Cl.$^5$ .................. B61B 5/00; A47H 15/04
[52] U.S. Cl. .................. 104/93; 211/123; 238/122; 238/140
[58] Field of Search .................. 104/93, 89, 91, 111, 104/121; 238/134, 122, 140; 211/123, 124; 16/87 R

[56] References Cited

U.S. PATENT DOCUMENTS

| | | | |
|---|---|---|---|
| 1,969,958 | 8/1934 | Alder | 211/123 |
| 2,052,606 | 9/1936 | Comstock | 211/123 |
| 2,063,585 | 12/1936 | Comstock | 211/123 |
| 2,084,322 | 6/1937 | Crane | 238/122 |
| 3,345,471 | 10/1967 | Kilburg | 104/93 |
| 3,384,244 | 5/1968 | Falek | 211/123 |

FOREIGN PATENT DOCUMENTS 2647280  5/1978  Fed. Rep. of Germany ...... 211/123

Primary Examiner—Robert P. Olszewski
Assistant Examiner—Mark T. Le
Attorney, Agent, or Firm—Willian Brinks Olds Hofer Gilson & Lione

[57] ABSTRACT

A hanger conveyance rail system for transporting at least one item on a clothes hanger is provided. The rail system includes a rail extending in a direction defining a moving direction, the rail having a shape adapted to receive the hook portion of the hanger such that the hook is received on a top portion thereof. The rail system further includes a removable cover affixed to the rail. The cover is (1) made of a flexible, low-friction material; (2) affixed to the rail such that the cover (i) extends along the moving direction; (ii) overlays at least the top portion of the rail; and (3) is configured to have an open cross-section, whereby the cover may be selectively removed from and overlayed on the rail over the rail.

33 Claims, 3 Drawing Sheets

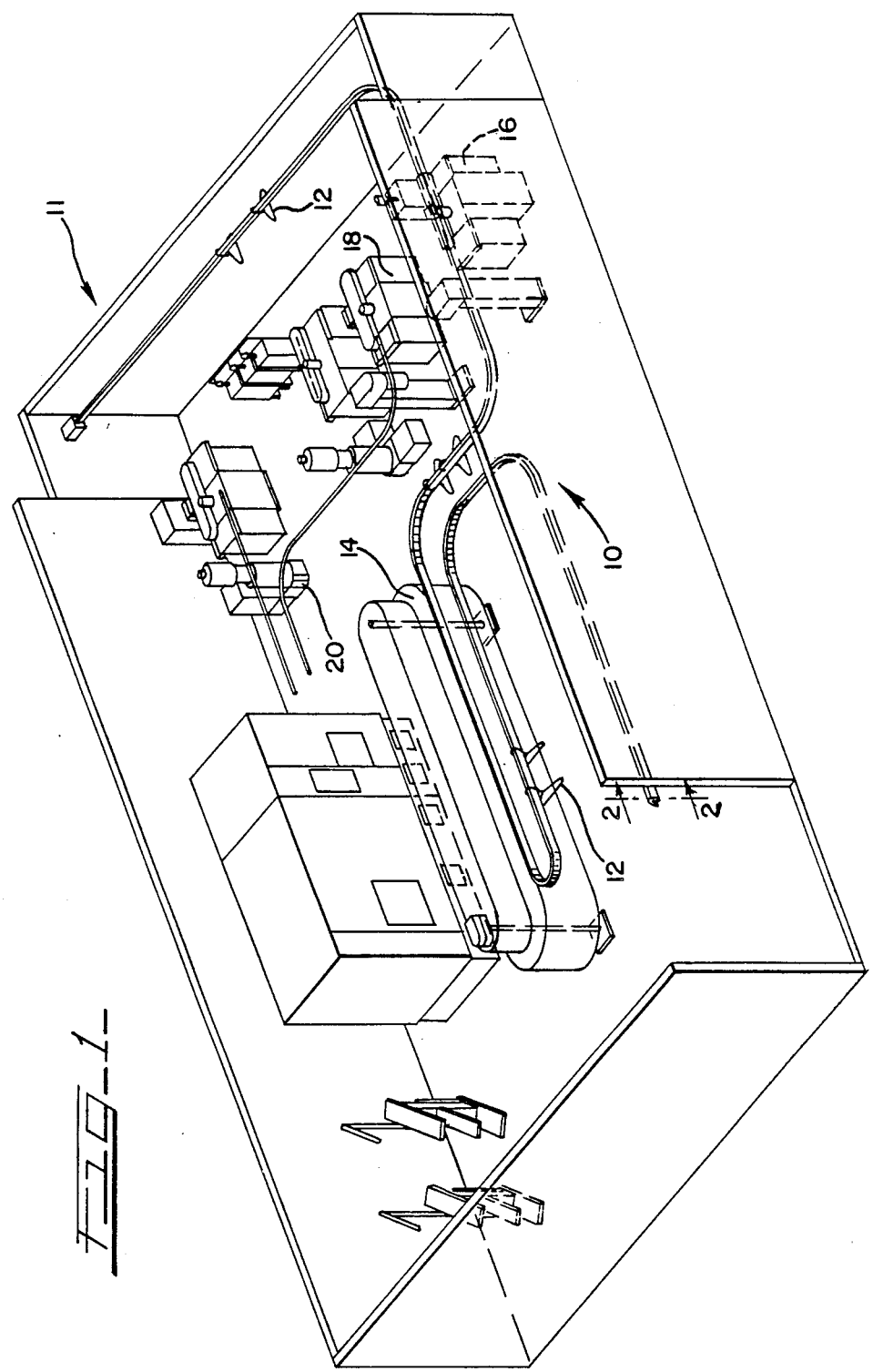

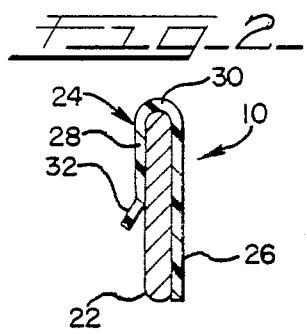
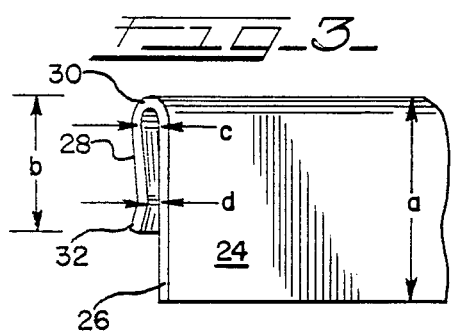
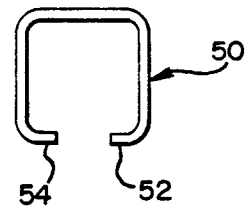

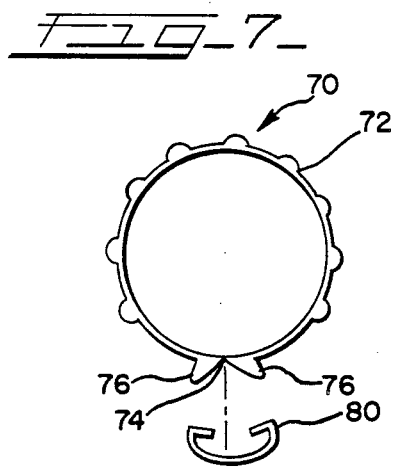
FIG_7_
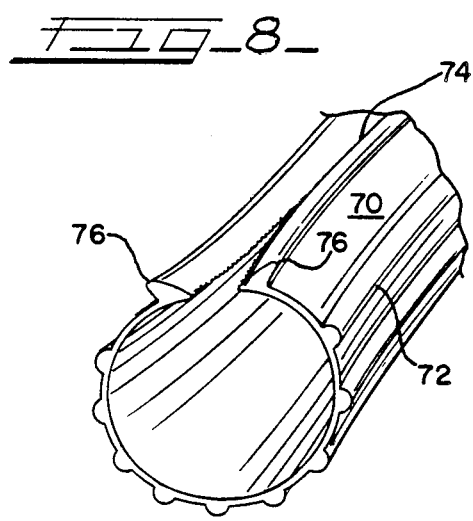
FIG_8_

COVERED HANGER CONVEYANCE RAIL SYSTEM

BACKGROUND OF THE INVENTION

The present invention is directed to a hanger conveyance rail system and more specifically to a hanger conveyance rail system which includes a low friction cover.

Present day laundry facilities, particularly large scale industrial laundry facilities, utilize rail systems on which clothes on hangers are transported between different locations. The rail systems typically include an overhead metallic rail on which the hook portion of the hanger glides as the clothes are pushed or pulled from one location o the next. With these rail systems a large number of clothes may be simultaneously pushed or pulled by an operator to guide them to the next processing location. These rail systems are typically referred to as glide or speed rails.

Although these speed rail systems are useful in transporting clothes between processing locations in these industrial type laundry facilities, they are not completely without disadvantages. First, both the rail and hangers are typically made of metallic material; the overhead speed rail being typically made of flat stock steel or pipe. Therefore, considerable friction occurs on the "glide surface" of the speed rail as the hangers are pushed or pulled on the rail. To reduce the friction between the hangers and the rail, the rail is typically greased or waxed. The grease or wax is typically applied by spraying or other well know conventional methods.

This waxing or greasing requirement results in several disadvantages in these facilities. For example, the grease or wax may be inadvertently deposited onto one of the garments which is to be cleaned, or even worse may be deposited onto an article of clothing which has already been cleaned. If wax is deposited onto a clean article of clothing the article may have to be recleaned or in an extreme case the wax may ruin the article.

Conventional rail systems also provide difficulties for the operator who handles the articles on the hangers between processing stations. As the hangers are manually removed by the operator from the rail system, the operator's hands and fingers will typically pick up some of the wax. If the operator then handles any garments which are to be cleaned or which have already been cleaned, the operator may then soil the garments with the wax which the operator has previously picked up from the hangers. Further, in a commercial setting the operator may also work at a counter accepting and delivering articles from customers which the laundry is to clean. The operator's hands will then have an embarrassing soiled appearance at the customer counter.

Present day rail systems also have disadvantages other than the inadvertent transfer of grease or wax to the articles which are being processed. For example, as the steel hangers are pushed and pulled manually along the overhead rail conveyance system, the friction which occurs on the glide surface removes the wax or grease from the glide surface. Eventually all of the wax that has been applied is removed and thus the rail becomes unwaxed and unprotected. The bare rail will then become rusty, pitted, worn and generally unattractive. Pushing and pulling the hangers becomes slow and sluggish. The operator must then exert a greater force to move the articles on the rail system. The operator thus becomes more tired and less efficient. Additionally, as the friction increases, the finished garments are crushed and wrinkled as they are pushed between work stations.

Further, as the wax wears off of the rail the noise generated by sliding the hangers on the rail will increase, thereby providing a less comfortable working environment. The noise level is also undesirable in a commercial setting where customers may have to bear the additional noise.

To avoid the sluggish movement and reduce the friction, the wax must be reapplied. This reapplication process is time consuming and the wax may be transferred to articles of clothing during the application process. Further, there is the continuous cost of the wax or grease. Although at less frequent periods, the rail must also be painted to protect the metallic rail from rusting and to enhance the aesthetic appearance of the rail.

The use of a low friction cover for a hanger support bar has been previously disclosed in the art. However the prior art devices are not suitable for modern day speed rail systems. For example, U.S. Pat. No. 3,384,244 discloses a support bar for clothes hangers which includes an elongated tubular core, a covering around the core, and spaced elongated bead members formed of anti-friction material disposed longitudinally on the covering. The beads prevent the clothes hangers from scraping the bar covering and thus facilitate sliding action along the support bar.

The arrangement disclosed in this patent however, is not suitable for modifying existing speed rail systems. First, the arrangement disclosed in this patent includes a closed cross section such that the cover envelopes the support bar. To assemble the cover and support bar system, the bar must be concentrically inserted into the cover. With such a configuration, existing speed rail systems would have to be completely replaced with a prefabricated rail which includes the closed covering as an integral component or the existing rail would have to be dismantled to provide access for the covering to be installed on the existing rail. In the latter case the system must then be reassembled.

Further, since present day laundry rail systems include curves and ramps, any covering which is installed over these existing rails must have the ability to conform to the curves in the rail without kinking, bending or breaking. In fact, it may be necessary for the cover to make a 180° turn within a two foot length. The cover must also be able to assume both inside and outside curves without lifting or separating from the rail surface at any point along the curve. Any lifting or separation may result in the cover being inadvertently removed from the surface of the rail.

With a closed cross sectional configuration, such as the one disclosed in the above-referred to patent, the cover element would not conform to the curves or ramps in the rail system unless the cover was specifically pre-molded for each individual system.

Additionally, for shipping purposes, it is desirable that the cover have the ability to be cut, coiled and boxed in pre-determined lengths, such as 25, 50 and 500 foot lengths, without kinking or cracking.

It is therefore desirable, to provide a covering which may be easily installed on existing rail systems. It is also desirable to provide a covering which may be easily shipped and sold in any desired length to accommodate existing systems without the need for seams between installed sections of the covering.

Therefore, it is an object of the present invention to provide a rail system including a cover which enhances the smoothness of the conveyance system's glide surface by reducing the friction between a metal hanger and the conveyance rail.

It is a further object of the present invention to provide a conveyance rail system which includes a durable cover which provides substantial periods of maintenance-free operation.

It is a further object of the present invention to provide a cover for a conveyance rail system which may be easily applied to an existing conveyance rail system without the need to dismantle the system.

It is still a further objection of the present invention to provide a removable cover for a rail system which is easily cut, coiled and packaged for shipment.

SUMMARY OF THE INVENTION

To achieve the foregoing and other objects and in accordance with the purposes of the present invention, the hanger conveyance rail system may include a conveyance rail which extends in a moving direction and a removable cover for the rail. The rail is shaped such that the hook portion of a hanger is received on a top sliding portion of the rail. The removable cover is made of a low-friction material and affixed to the rail such that the rail extends along the moving direction. The cover is affixed such that it overlays at least a top portion of the rail. The cover is also configured to have an open cross section such that the cover may be selectively removed from the rail or applied to the rail over the rail.

With the configuration of the rail cover of the present invention, the rail cover may be applied to existing laundry rail systems thereby eliminating the need to replace existing metallic rails. Further, since the rail has an open cross section, it may be applied over the rail and there is no need to disassemble existing rail systems to apply the cover.

Additional objects, advantages and novel features of the invention will be set forth in part in the description which follows, and in part will become apparent to those skilled in the art upon examination of the following or may be learned by practice of the invention. The objects and advantages of the invention may be obtained by means of the combinations particularly pointed out in the appended claims.

BRIEF DESCRIPTION OF THE DRAWINGS

FIG. 1 schematically illustrates a preferred embodiment of the covered conveyance rail system of the present invention in a laundry facility.

FIG. 2 illustrates a sectional view through line 2—2 of the rail and rail cover of the conveyance rail system illustrated in FIG. 1.

FIG. 3 illustrates a perspective view, in partial section, of the rail cover illustrated in FIG. 2.

FIG. 4 illustrates a preferred embodiment of the rail cover of the present invention having a generally U-shaped cross section.

FIG. 5 illustrates a preferred embodiment of the cover of the present invention having a generally rectangular cross section.

FIG. 6 illustrates another preferred embodiment of the present invention including a clothes rack having rail covers.

FIG. 7 illustrates a sectional view of a preferred embodiment of the cover of the present invention which includes a frangible web.

FIG. 8 is a perspective view of the cover illustrated in FIG. 7 with the frangible web partially broken.

DESCRIPTION OF THE PRESENTLY PREFERRED EMBODIMENTS

Referring now specifically to FIG. 1, a laundry facility is illustrated which includes a rail system 10 for transporting a plurality of hangers 12 between various stations. The rail system 10 may be used to transport articles of clothing disposed on hangers between a first station 14 and a second station 16. The entire rail system 10 of the laundry facility 11 includes various segments which may or may not be interconnected. For example, the rail system 10 may include a segment of rail for transporting articles of clothing disposed on hangers 12 between a third station 18 and a fourth station 20. As illustrated in the drawing, the rail segment between stations 18 and 20 is not connected to the rail segment between stations 14 and 16. There may be other additional rails which may or may not be connected to other rail segments. The specific configuration of connected and unconnected rails segments will depend on the particular needs of the specific laundry facility 11.

As illustrated in FIG. 1, the rail system 10 may include various curves each having a different radius of curvature. The rail 10 may have several 90° turns or may include 180° turns in a relatively short amount of space. For example, the rail system 10 at the end of station 14 includes a 180° turn. The particular space restrictions of the facility 11 may require that the rail 10 have a radius of curvature such that the 180° turn is accomplished in about a two-foot length. Further, the rail system 10 may include ramps to move the hangers between various elevations. Thus, the cover for the rail must be adapted to conform to the various curves and ramps in the rail system 10.

Referring now specifically to FIGS. 2 and 3, a preferred embodiment of the conveyance rail system 10 is illustrated. The rail system 10 includes a rail 22 for supporting hangers holding articles of clothing. The rail 22 illustrated in FIG. 2 includes a cross section with two flat opposed walls defining the sides of the rail 22 and two curved sections on the top and bottom joining the two rail walls. The rail 22 may be made of a metal or any other suitable material which provides the desired support strength. A cover 24 is shaped such that it may be slidably disposed over the top of the rail 22 without having to disassemble the rail system 10. In this preferred embodiment, the cover 24 includes a generally U-shaped cross section, and preferably a generally J-shaped cross section. In this embodiment, the cover includes a first leg 28 which extends partially down the side of the rail wall and a second leg 26 which extends the length of the side wall of the rail 22. The two walls 26 and 28 are connected by a curved portion 30. The cover also preferably includes a flanged section 32 which extends outwardly away from the rail 22. As an example, the J-shaped cross-sectional configuration for the cover 24 may have the following dimensions when it is not disposed over the rail. The length "a" of the longer leg 26 may be approximately 1.342" and the combined length "b" of the second leg 28 and flanged section 32 may be approximately 0.850". The lateral distance between the legs 26 and 28 near the top curved portion 30 may be approximately 0.400" while the lateral distance "d" between the legs 26 and 28 near the bottom end of leg 28 may be approximately 0.200". A suitable wall thickness for the cover 24 may be approximately 0.062". This distance "d" is less than the width of the rail 22. When the cover 24 is affixed to the rail 22, the cover 24 exerts a clamping force on the rail 22. Thus, the shape of the cover 24 provides it with a spring clip action to help affix it to the rail 22.

As described in more detail below, the cover 24 is made of a resilient flexible material, and as described above the cover 24 is configured such that the cover 24 clamps or snaps on to the rail 22 when the cover 24 is positioned on the rail 22.

The cover thus comprises a member which includes an open cross section. That is, the cross section of the cover is such that the wall or walls of the cover do not close upon themselves. The walls of the cover may meet but include an opening or slit through which the cover may be disposed over the rail 22 without having to disassemble the rail system. The slit or opening also provides the cover 24 with a more flexible configuration.

The cover 24 is preferably made of a pliable, flexible material which has a low coefficient of friction. As used here, a pliable, flexible material is a material which has a flexural modulus, 1% secant of about 110,000 psi and a flexural modulus of elasticity of about 77,000 psi. A material which has a low coefficient of friction is defined here as a material which includes a static coefficient of friction of from about 0.2 to about 0.25 and a dynamic coefficient of friction of from about 0.15 to about 0.20 against Cr-plated steel at 23° C. A preferred material is a high-density polyethylene material and more preferably an ultra-high molecular weight high-density polyethylene material having a molecular weight range between 3 and 6 million. A suitable ultra-high molecular weight polyethylene material is available from Himont, Inc. (Wilmington, Del.). Other suitable materials include malubniumdisulphide which comprises a mixture of high-density polyethylene, graphite and nylon; and a material available under the trade name ULTREX 10 which comprises a mixture of high-density polyethylene, graphite, silicone and teflon. These preferred materials provide a high-impact resistant covering which has a low coefficient of friction and which may be economically manufactured and shipped. The cover may be manufactured to have the desired configuration by extrusion methods such as ram extrusion, screw extrusion or vacuum dye screw extrusion.

Because of the open cross section configuration, the cover of the present invention may be easily applied to existing speed rail systems. The combination of the configuration and properties of the materials used helps to provide the desired property of the cover. The flexibility and pliability of the material allows the cover to be placed on a rail and assume both the inside and outside curves without lifting or separating from the rail surface at any point along the curve and also along the dips and rises of the rail systems. As will be recognized by those skilled in the art, the cover may also be configured such that it completely surrounds the rail. Since the cover material is flexible and resilient, the cover is defined here as clamping on the rail since it encases the rail and is maintained on the rail because of the resilient closing action of the cover.

The cover may be cut in large lengths (such as 500 foot lengths), coiled in coils of any appropriate diameter (such as a 3' diameter) and boxed without kinking or cracking. The boxed cover may then be shipped to the selected destination and applied to the existing rail system without disassembling the rail system. The cover may be easily applied over the rail since it includes the open cross section. Additionally the material preferably has a low memory factor, to allow the material to be easily uncoiled as it is removed from the shipping carton. As discussed above, since the cover is configured to clamp or snap on to the rail, no glue or other fastening means is necessary. The flanged portion 32 allows the cover 24 to be easily applied to the rail 22 (FIGS. 2 and 3).

FIG. 4 illustrates another preferred embodiment of the cover. A cover 40, having a generally U-shaped cross section, includes two wall portions 42 and 44. As illustrated in FIG. 4, the cross section may be configured such that the ends of the walls 42 and 44 meet when the cover is not disposed over the rail. This configuration provides a clamping force from the walls 42 and 44 to the rail walls when the cover 40 is applied to a rail. The clamping force thus maintains the cover 40 affixed on the rail. If desired, the cover 40 may also be configured such that the walls 42 and 44 do not meet and assume a more U-shaped cross section (not shown). A preferred wall thickness for the illustrated embodiment is approximately 0.060".

FIG. 5 illustrates another preferred embodiment of the cover of the present invention. A cover 50 includes a generally rectangular cross section. The bottom portion of the cover 50 includes two wall sections 52 and 50 which are separated by an opening. This opening allows the cover to be installed over an existing rail system. The leg portions 52 and 54 of the cover 50 function to affix the cover 50 to the rail. A preferred wall thickness for this embodiment is approximately 0.0625".

The cover and rail system of the present invention may be used on any device which is used to hold articles of clothing on hangers. As an example, FIG. 6 illustrates a rack 60 which includes a plurality of holding arms having a generally rectangular cross section. The holding arms are used to hold articles of clothing on hangers. The holding arms each include a cover 62 which is made according to the particular shape of the arms. The cover 62 facilitates the sliding of hangers on the arms. The cover 62 may also serve to improve the appearance of the rack 60. Since these types of racks are usually chromed, the covers 62 may be used to prolong the life of the chrome plating or to cover surfaces where the chrome has been removed.

As described above some hanger conveyance rail systems include a pipe, which has a generally circular cross section, as the rail. FIGS. 7 and 8 illustrate a preferred embodiment of a cover for such rail systems. In this embodiment, a cover 70 is configured to envelope or to at least partially cover the surface of a rail having a circular cross section.

However, it has been found that shipping covers having this circular cross section presents a problem. When these circular cross sections lengths are coiled, they kink, twist, buckle and generally fold along the slit which extends along the longitudinal length of the cover. To avoid this problem, the present invention contemplates a frangible web member at the slit section 74. The frangible web or seal helps to prevent the walls of the cover 70 from separating at the slit section 74 when long lengths of the cover 70 are coiled for packaging. After the lengths of the cover 70 have reached their destination, the frangible web may be broken and the cover 70 applied over existing rails without the need to disassemble the existing rail system.

In this preferred embodiment, ribs or nodes 72 which extend along the lengths of the cover may also be provided. These ribs 72 provide two distinct functions. First, they help to reduce the sliding surface area between the hanger hook and the cover 70. This reduces the frictional forces as the hanger is glided down the surface of the cover 70. Additionally, these ribs 70 also function to stabilize the cover 70 as it is being coiled. That is, these ribs also help prevent the kinking, buckling and twisting which has been described above.

It may also be desirable to secure the cover 70 over a rail at predetermined intervals. Thus, in this preferred embodiment the cover 70 also includes two lips 76 which are provided on each side of the frangible web 74. The lips 76 can be fastened together at predetermined intervals by any suitable clip such as clip 80. Thus, the lips 76 can be used to prevent the cover 70 from separating at the slit section after it has been applied to the rail.

Preferably the ribs 72, the frangible web or seal 74 and the lips 76 are formed as an integral component of the cover 70 when the cover 70 is manufactured. Accordingly, these components may be extruded as part of the cover 70. In a preferred embodiment the wall thickness of this cover 70 is approximately 0.0625" and an outer diameter of approximately 1.03". The nodes 72 each have a 0.102" diameter and are spaced approximately 30° apart around the outer surface of the cover 70.

As will be recognized by those skilled in the art, other configurations are possible for the cross section of the cover. The particular cross section will depend on the cross section of the rail to which the cover is being applied. For example, if the cross section of the rail is that of a half circle, the cover may comprise a cross section which includes a half circle and two legs which extend inwardly towards each other from the ends of the half circle. These legs will help to secure the cover on to the rail. Other configurations include triangular shaped cross-sections or other variations of the above described embodiments.

In laundry or other facilities which use glide rails, the clothes being transported on the hangers may need to be separated into various sets or categories. For example, clothes which have to be pretreated may need to be transported to a first station on a particular rail while the rest of the clothes which are not to be pretreated may need to be transported to a different station on a separate rail. These two rails may be close to each other in the processing facility so that the operator at this station may sort the clothing by placing them on the appropriate rail. In a particularly advantageous embodiment of the conveyance rail system of the present invention, the low friction covers are color coded. In this manner a rail which transports clothing to one station may have a cover of one color while a rail which is to transport clothes to a different station will have a cover of a different color. The color coding may be for product identification, location identification, special need or process identification or any other suitable identification requirement. This color coded system will help the operator in placing the clothes on the appropriate rail.

Thus, the cover of the present invention provides several advantages when applied to existing or new speed rail systems. Since the cover is made of a low-friction material, dirt, grease or other foreign materials will not stick to the surface of the cover. The cover surface will remain clean thus preventing foreign materials from being transferred to the articles of clothing being moved on the rail. The cover also improves travel of the hangers over the rail by reducing friction. The need to apply lubricants such as waxes, sprays, etc. is eliminated. Since the lubricants are eliminated the hands and the fingers of the operator will not be grimed by these lubricants. Further, the cover helps to prevent crushing and wrinkling of garments as they are pushed or pulled down the rail. The cover also helps to reduce the noise level in the facility. The operator effort in moving the articles of clothing is also reduced. The cover helps to eliminate corrosion of the rail or bar due to moisture, solvents, etc. The cover also helps to eliminate the need for painting, anodizing or chroming of the rails or bars.

The specific configuration and choice of materials also helps to provide an easy method of installing the cover over existing rail systems. Since the cover may be extruded in continuous lengths of several hundred feet and cut into the small measured lengths to meet the specific needs, the need to butt seams or make joints is eliminated. The cover may be applied over existing rail systems without disassembling of the support mechanism. The cover may be trimmed around bolts, etc. Since the cover is preferably made of a high-density polyethylene material, the cover may be manufactured in several colors as desired and thus the cover may also function to improve the appearance of the facility. Additionally the covers may be color coded for various needs.

The foregoing description of the preferred embodiments of the present invention has been presented for purposes of illustration and description. They are not intended to be exhaustive or to limit the invention to the precise forms disclosed, and obviously many modifications and variations are possible in light of the above teachings. The embodiments were chosen and described in order to best explain the principals of the inventions and its practical applications to thereby enable others skilled in the art to best utilize the invention in various embodiments and with various modifications as are suited to the particular use contemplated. It is intended that the scope of the invention be defined by the following claims, including all equivalents.

What is claimed is:

1. In a hanger conveyance rail system for transporting at least one clothes hanger having a hook portion, the hanger conveyance rail system including a rail extending in a direction defining a moving direction, the rail having a curvature in the moving direction including at least one curve, the rail having a shape adapted to receive the hook portion of the hanger such that the hook is received on a top portion thereof, the improvement comprising:

a removable cover, the cover being (1) made of a flexible, low-friction material such that the cover is conformable to the curvature of the rail; (2) affixed to the rail such that the cover (i) extends along the moving direction and (ii) overlays at least the top portion of the rail; and (3) configured to have an open cross-section whereby the cover may be selectively removed from and overlaid on the rail over the rail.

2. The hanger conveyance rail system of claim 1 wherein the cover is configured to clamp onto the outer surface of the rail.

3. The hanger conveyance rail system of claim 1 wherein:
   the rail includes a pair of opposed flat side walls, the flat rail walls being disposed orthogonal to the moving direction; and
   the cover comprises a pair of opposed side walls and a curved portion, the cover side walls and the curved portion configured such that the cover includes a generally U-shaped cross section and such that the cover side walls engage and provide a clamping force on the flat side walls of the rail.

4. The hanger conveyance rail system of claim 2 wherein at least one of the cover side walls includes a flanged portion extending outwardly from the rail.

5. The hanger conveyance rail system of claim 1 wherein the cover material comprises a high density polyethylene material.

6. The hanger conveyance rail system of claim 2 wherein the cover material comprises a high density polyethylene material.

7. The hanger conveyance rail system of claim 3 wherein the cover material comprises a high density polyethylene material.

8. The hanger conveyance rail system of claim 5 wherein the high density polyethylene material cover material comprises an ultra-high molecular weight polyethylene material.

9. The hanger conveyance rail system of claim 1 wherein the cover includes a generally rectangular cross-section.

10. The hanger conveyance rail system of claim 1 wherein the cover includes a generally circular cross-section.

11. In hanger rail system for supporting at least one clothes hanger having a hook portion, the hanger rail system including a rail extending in a direction defining a moving direction, the rail having a curvature in the moving direction including at least one curve, the rail having a shape adapted to receive the hook portion of the hanger such that the hook is received on a top portion thereof, the improvement comprising:
   a removable cover being (1) made of a flexible, low-friction material such that the cover conforms to the curvature of the rail; (2) affixed to the rail such that it extends along the moving direction; and (3) configured such that (i) includes an open cross-section, (ii) encases at least the top portion of the rail and (iii) clamps the rail.

12. The hanger rail system of claim 11 wherein:
   the rail includes a pair of opposed flat side walls, the flat rail walls being disposed orthogonal to the longitudinal direction: and
   the cover comprises a pair of opposed side walls and curved portion, the cover side walls and the curved portion configured such that the cover includes a generally U-shaped cross section and such that the cover side walls engage and provide a clamping force on the flat side walls of the rail.

13. The hanger rail system of claim 12 wherein at least one of the cover side walls includes a flanged portion extending outwardly from the rail.

14. The hanger rail system of claim 13 wherein the cover includes a generally J-shaped cross section.

15. The hanger rail system of claim 11 wherein the cover material comprises a high density polyethylene material.

16. The hanger rail system of claim 12 wherein cover material comprises a high density polyethylene material.

17. The hanger rail system of claim 16 wherein the high density polyethylene cover material comprises an ultra-high molecular weight polyethylene material.

18. The hanger rail system of claim 11 wherein the cover includes a generally circular cross-section.

19. The hanger rail system of claim 11 wherein the cover includes a generally rectangular crosssection.

20. In a hanger conveyance rail system for transporting a plurality of clothes items arranged in a plurality of sets, the clothes disposed on hangers, the hangers each having a hook portion, the hanger conveyance rail system including a plurality of rails each extending in a direction defining a respective moving direction, at least one of plurality of rails having a curvature in the moving direction including at least one curve, a removable cover being (1) made of a flexible, low-friction material such that the cover conforms to the curvature of the rail; (2) affixed to a respective rail such that the cover (i) extends along the moving direction of the respective rail and (ii) overlays at least the top portion of the respective rail; (3) configured to have an open cross-section whereby the cover may be selectively removed from and overlaid on the respective rail over the respective rail and (4) color coded such that a different color is associated with each set of clothes.

21. The hanger conveyance rail system of claim 20 wherein each of the covers is configured clamp onto the outer surface of the respective rail.

22. A cover of a rail of a rail system for supporting and transporting at least one item disposed on a hanger the hanger having a hook portion, the rail system including the rail extending in a direction defining a longitudinal direction, the rail configured to receive the hook portion of the hanger on a top portion thereof, the cover comprising:
   a generally tubular member made of a flexible, low friction material, the member configured to encase at least the top portion of the rail, the member including a frangible web extending along the longitudinal direction of the member.

23. The cover of claim 22 further including at least one rib extending along the longitudinal direction on the outer surface of the tubular member.

24. The cover of claim 23 wherein the rib is formed as an integral component of the tubular member.

25. The cover of claim 24 wherein the tubular member is configured to envelope the rail.

26. The cover of claim 22 wherein the tubular member is comprised of a high density polyethylene material.

27. The cover of claim 26 wherein the high density polyethylene material cover comprises a ultra-high molecular weight polyethylene material.

28. The cover of claim 24 wherein the tubular member is comprised of a high density polyethylene material.

29. The cover of claim 28 wherein the high density polyethylene cover material comprises an ultra-high molecular weight polyethylene material.

30. The cover of claim 22 further including:
   a pair of lip members, wherein one lip member is disposed on each side of the frangible web, the lip members integrally formed as part of the cover; and a clip configured to clamp the two lip members together.

31. A cover of a rail of a rail system, the rail system including the rail for supporting and transporting at least one item disposed on a hanger, the hanger having a hook portion, the rail extending in a longitudinal direction defining a moving direction, the rail configured to receive the hook portion of the hanger on a top portion thereof, the cover comprising:

a longitudinal member made of a material selected from the group consisting of ultra-high molecular weight polyethylene material, malubniumdisulphide and a material comprising a mixture of high-density polyethylene, graphite, silicone and teflon:

the cover element including a generally U-shaped cross section wherein the legs of the U define cover walls along the longitudinal direction, the cover being configured such that the walls of the generally U-shaped member provide a clamping force on the rail.

32. The hanger rail cover of claim 31 wherein at least one of the walls of the member includes flanged portion extending outwardly.

33. The rail cover of claim 31 wherein the cover member includes a generally J-shaped cross section.

* * * * *